(12) United States Patent
Lepoutre

(10) Patent No.: US 9,932,942 B2
(45) Date of Patent: Apr. 3, 2018

(54) FLEXIBLE POROUS NON-POLLUTIVE TUBE

(71) Applicant: Edmond Pol Jean Lepoutre, Serrinha (BR)

(72) Inventor: Edmond Pol Jean Lepoutre, Serrinha (BR)

( * ) Notice: Subject to any disclaimer, the term of this patent is extended or adjusted under 35 U.S.C. 154(b) by 0 days.

(21) Appl. No.: 14/698,056

(22) Filed: Apr. 28, 2015

(65) Prior Publication Data

US 2016/0061157 A1 Mar. 3, 2016

(30) Foreign Application Priority Data

Aug. 26, 2014 (BR) .............................. 102014021034

(51) Int. Cl.
*B01D 53/04* (2006.01)
*B32B 15/08* (2006.01)
*B32B 1/08* (2006.01)
*F16L 11/14* (2006.01)
*F02M 35/02* (2006.01)
*F02M 35/10* (2006.01)
*F02M 35/12* (2006.01)
*F02M 33/04* (2006.01)
*B01D 46/00* (2006.01)
*B01D 46/42* (2006.01)
*F02M 35/024* (2006.01)

(Continued)

(52) U.S. Cl.
CPC ..... *F02M 35/0216* (2013.01); *B01D 46/0036* (2013.01); *B01D 46/4236* (2013.01); *B01D 53/0462* (2013.01); *F02M 33/043* (2013.01); *F02M 35/0218* (2013.01); *F02M 35/02441* (2013.01); *F02M 35/10137* (2013.01); *F02M 35/10281* (2013.01); *F02M 35/12* (2013.01); *F02M 35/1272* (2013.01); *B01D 2253/102* (2013.01); *B01D 2257/702* (2013.01); *B01D 2259/4516* (2013.01); *B01J 21/18* (2013.01); *F02M 35/10334* (2013.01); *F02M 35/1277* (2013.01); *F16L 11/118* (2013.01); *F16L 55/0336* (2013.01)

(58) Field of Classification Search
CPC ........... B01D 53/04; B32B 15/08; B32B 1/08; B32B 2307/726; B32B 2307/7265; B32B 2307/752; B32B 2597/00; F16L 58/1036; F16L 11/14; F16L 11/045
USPC ......... 55/521, 527, 385.3; 96/135, 153, 154; 123/198 E, 518; 138/125, 138
See application file for complete search history.

(56) References Cited

U.S. PATENT DOCUMENTS 6,379,437 B1 * 4/2002 Heinonen .............. B01D 53/02
 55/521
7,163,625 B1 * 1/2007 Williamson ....... B01D 39/1615
 210/315

(Continued)

*Primary Examiner* — Frank Lawrence, Jr.
*Assistant Examiner* — Minh-Chau Pham
(74) *Attorney, Agent, or Firm* — Bay State IP, LLC

(57) ABSTRACT

A flexible porous non-pollutive tube, wherein the walls of the tube are made by tapes formed by interlaced textile fibers, and to which activated charcoal is added, in agglomerate, powder or granulated form, and the textile tapes being wound over the charcoal and glued among the charcoal in the helical direction, forming an air conducting acoustic flexible helical pipe which is a part of a combustion engine's intake system used by the automobile industry, and adding the activated charcoal in the walls or in the pipe's external or internal lining.

6 Claims, 5 Drawing Sheets

(51) Int. Cl.
*B01J 21/18* (2006.01)
*F16L 11/118* (2006.01)
*F16L 55/033* (2006.01)

(56) References Cited

U.S. PATENT DOCUMENTS

| | | | | |
|---|---|---|---|---|
| 7,276,098 | B2 * | 10/2007 | Koslow | B01D 46/0012 |
| | | | | 55/385.3 |
| 7,547,350 | B2 * | 6/2009 | Callahan | B01D 53/0415 |
| | | | | 123/198 E |
| 7,678,178 | B2 * | 3/2010 | Boddu | B01D 46/0058 |
| | | | | 502/408 |
| 8,343,264 | B2 * | 1/2013 | Dallas | B01D 39/04 |
| | | | | 55/486 |
| 2004/0118387 | A1 * | 6/2004 | Lawrence | B01D 53/02 |
| | | | | 123/518 |
| 2006/0162704 | A1 * | 7/2006 | Hagler | F02M 25/0854 |
| | | | | 123/518 |
| 2006/0185651 | A1 * | 8/2006 | Hagler | F02M 25/0854 |
| | | | | 123/518 |
| 2013/0306548 | A1 * | 11/2013 | Kreibig | B01D 29/111 |
| | | | | 210/488 |
| 2014/0305531 | A1 * | 10/2014 | Graham | B32B 15/08 |
| | | | | 138/125 |
| 2016/0076490 | A1 * | 3/2016 | Makino | F02M 25/089 |
| | | | | 123/519 |

\* cited by examiner

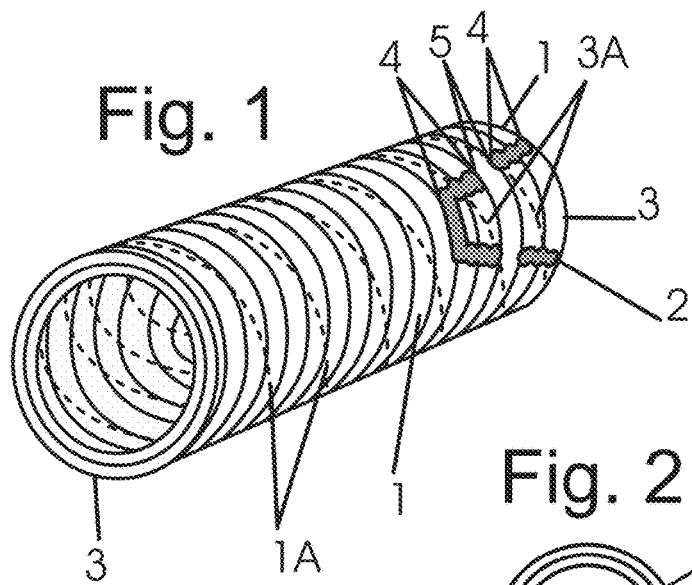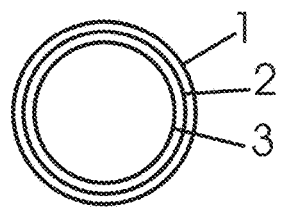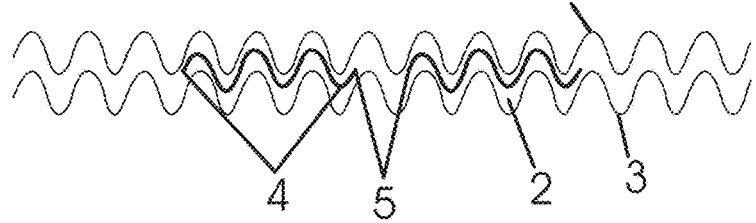

FLEXIBLE POROUS NON-POLLUTIVE TUBE

CROSS REFERENCE TO RELATED APPLICATION

This application claims the benefit of and takes priority from Brazilian Patent Application No. BR102014021034-2, filed on Aug. 26, 2014.

The current invention patent refers to an anti-pollution porous flex pipe that has its walls essentially comprised by tapes formed by interlaced textile fibers, to which activated charcoal is added, in the form of an agglomerate, in powder or granulated, the textile tapes being wound over it and glued among it in the helical direction, forming an air conducting acoustic flexible helical pipe which is a part of the intake system of the combustion engines used by the automotive industry.

As people skilled in the art are well aware of, there are pipes, currently, which are usable in air conduction by various industries, among which the automotive industry, said pipes being porous, manufactured from textile fibers. Such pipes, by their constitution, avoid the excess diffusion of mechanical noises and avoid the use of the well-known acoustic boxes.

In the current international technology, there are flex pipes for air conduction which are manufactured from helical juxtapositions of uniform tapes, undulated or not, of various materials, which can be glued or thermal glued among it, observing that said uniform tapes are confectioned in a metallic material, plastic material or composite fibrous material, the manufacturing process of these flex pipes being fast, and the strength and sealing qualities of each flex pipe occurring by the helical juxtapositions of the uniform tapes. Such air conducting helical flex pipes have obtained progress in the last few years in regard to acoustics.

Still regarding the state of the art, the existence of anti-pollution devices is noted, coupled or not in air conducting acoustic pipes which are used mainly by the automotive industry in conducting fresh air to the combustion engine. Such pipes are rigid or flexible, the flexible ones being comprised by porous textile material, having helical construction or not, and walls partially or fully porous.

Therefore, said air conducting pipes are coupled to anti-pollution containers, internationally known by the denomination canister, which contain activated charcoal with the purpose of retaining the particles of hydrocarbons that are produced by a combustion engine. The containers named canister form a monoblock whole that is coupled onto the air conducting pipe, absorbing the residual gases from the system.

However, in practice, there is a technological gap pertinent to the elimination of environmental pollution factors. The current constructive technique applied in the air conducting pipes does not foresee that said pipes, by themselves, carry out the retaining of polluting hydrocarbons—produced by a combustion engine—in the walls which integrate their construction when said engine is switched off.

Consequently, for instance, undesirable gases are produced by the combustion when a vehicle's engine is switched on—badly burned in part—with hydrocarbons that are normally expelled through the tailpipe and often eliminated by catalysts. With the engine switched off, the badly burned gases, residual volatile, confined in the combustion chambers, return through the air intake pipes and are directed to the free air. These polluting gases are spread out in the environment and breathed by whomever is nearby, even with the vehicle being parked outdoors. If the vehicle is parked inside a garage, the condition of aspiration by a human being can be highly toxic.

SUMMARY

The anti-pollution porous flex pipe, object of the current invention, was idealized in secrecy and designed to remedy the inconveniences and deficiencies present in the state of the art report, filling the requirements of newness, inventive activity and industrial application, since the proposed pipe—for conducting the air up to the engine—has had its wall comprised of tapes formed by interlaced textile fibers, to which activated charcoal is added, in powder, agglomerate or granulated form, the textile tapes being wound over it and glued among it in the helical direction, forming an air conducting acoustic flex pipe which is a part of the intake system of combustion engines and which reduces environmental pollution by their composition.

The technical effect obtained by means of this invention allows the attenuation of the acoustic waves, produced by the function of the combustion engine, to take place in the anti-pollution porous flex pipe, which is also acoustic, simultaneously allowing that the activated charcoal, in agglomerate, powder or granulated form, added to the textile tapes, adsorb and retain the polluting hydrocarbons particles in the very body of the conducting pipe when said engine is switched off.

The construction of the anti-pollution porous flex pipe, object of the current invention, follows the principle that its walls are basically comprised of tapes formed by interlaced textile fibers, which present continuous undulation—an aspect that allows for greater surface contact —, observing that the phenomenon of adsorption depends on the contact surface and the concentration of the activated charcoal in the textile fibers. The anti-pollution porous flex pipe can be comprised of multi-layers of different materials, whether porous or not; however, the greater use of the tapes formed by interlaced textile fibers, with continuous undulation, for comprising the pipe walls, allows a greater acoustic effect and greater anti-pollution effect to be obtained.

When the combustion engine is switched on again, and the re-warming of the anti-pollution porous flex pipe, object of this patent, is verified, the hydrocarbons are released from the added activated charcoal in the textile tapes, and drawn into the combustion engine, followed by the burning of the hydrocarbon particles in the engine's combustion chamber.

BRIEF DESCRIPTION OF DRAWINGS

This patent can be better understood in the light of the attached drawings and their remarks, by which we have:

FIG. 1, shows a cut-out perspective of the anti-pollution porous flex pipe, which in an optional embodiment presents walls, both externally and internally comprised of fibers formed by interlaced textile fibers, to which activated charcoal is added, in agglomerate, powder or granulated form, the textile tapes being wound over it to the helical direction over a support such as thermoplastic or solid material fiber, whether aluminum, PVC or other.

FIG. 2, shows a section view of the anti-pollution porous flex pipe presented in FIG. 1.

FIG. 3, shows, in longitudinal section, a part of the wall of the anti-pollution porous flex pipe presented in FIG. 1.

DETAILED DESCRIPTION OF THE PREFERRED EMBODIMENT

Figure 4:
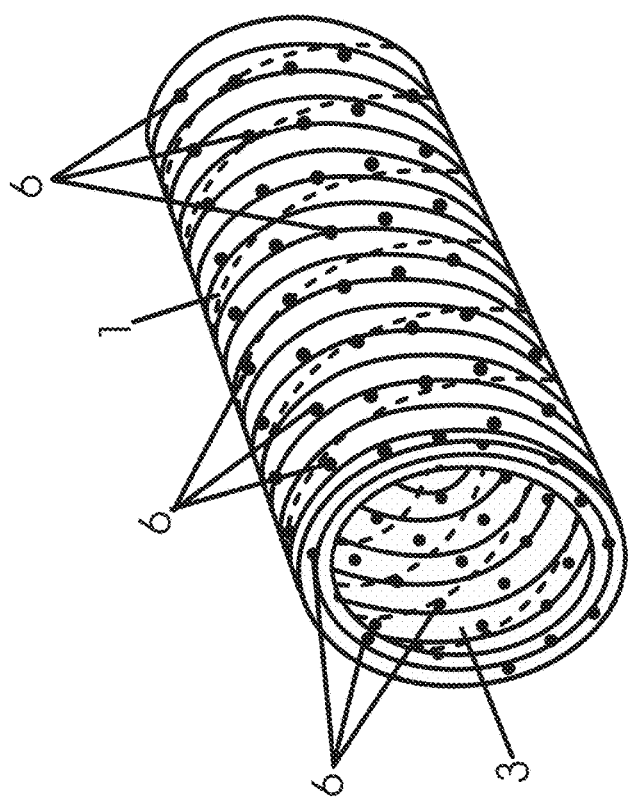
FIG. 4, shows a perspective of the anti-pollution porous flex pipe, evidencing the tapes formed by interlaced textile fibers, full of activated charcoal, which forms its walls or its external and internal lining, according to the optional embodiment foreseen in FIG. 1.

According to what is depicted in FIGS. 1 to 3, an anti-pollution porous flex pipe, also acoustic, is evidenced as an embodiment foreseen for combustion engines, being comprised of a tape of variable wideness and non-porous material (2), such as, for instance, a tape (2) made of aluminum, PVC, thermoplastic or other, with helical arrangement, intercalated and discontinued in the pipe, having wall or external lining (1) and wall or internal lining with a smaller diameter (3), which allow for controlling the porous segments (5) in the pipe structure—for acoustic regulation —, the walls or the external (1) and/or internal (3) lining being comprised by tapes (3-A) formed by interlaced textile fibers, of porous material, of variable wideness, wound over it and glued in the helical direction, and which are also arranged in a helical, intercalated and discontinuous manner in the pipe walls, having the textile tapes of porous material with added activated charcoal in them (6), in agglomerate, powder or granulated form—see FIG. 4 —, while the tape of variable wideness and non porous material (2) determines by its wideness or its arrangement a porous segments (4) in the pipe structure.

It must be stressed that the tapes formed by interlaced textile fibers, of porous material, full of activated charcoal (6)—which comprise the walls or external (1) and internal (3) lining of the anti-pollution porous flex pipe—can be juxtaposed, interposed or intermingled with other tapes made of non porous material, for example, the aluminum tape, so as to open a space in the pipe wall.

The anti-pollution porous flex pipe can also be embodied with only the wall or the internal lining of smaller diameter (3), comprised of tapes formed by interlaced textile fibers of porous material, to which activated charcoal is added (6) in agglomerate, powder or granulated form, according to the pipe's acoustic adsorption and anti-pollution needs.

Figure 5:
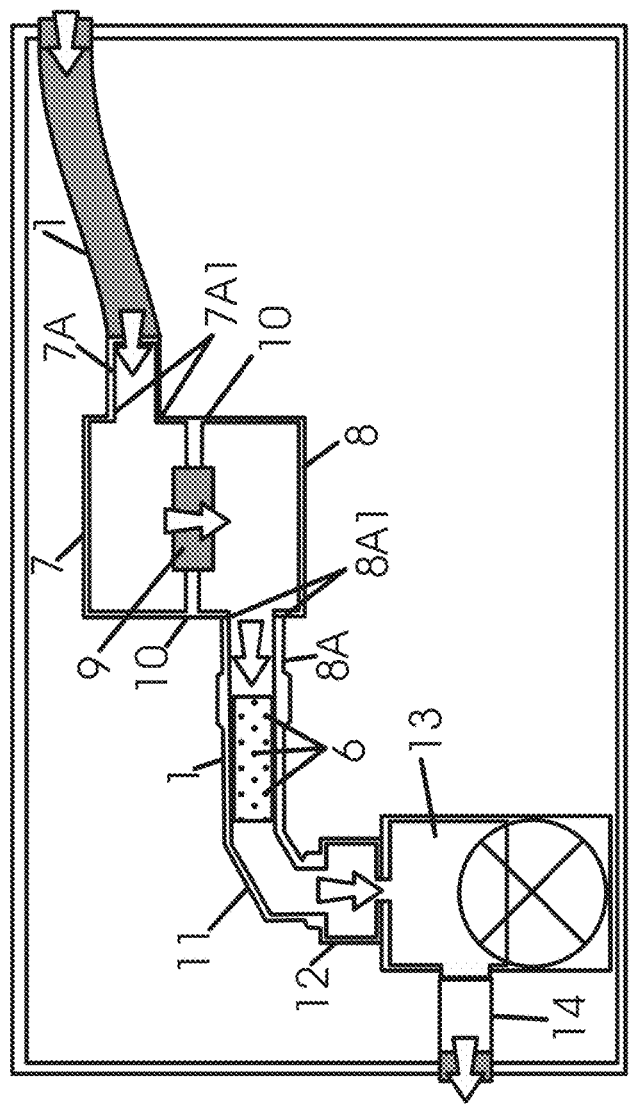
FIG. 5, shows a schematic view the complete air intake system.

The anti-pollution porous flex pipe is a part of the complete air intake system of a combustion engine, being appropriate for a better understanding of this invention, the attachment of the drawings that follow and their remarks:

FIG. 5, shows in a schematic view the complete air intake system, having two anti-pollution porous flex pipes integrated into it, one at the dirty air intake part and the other at the already cleaned air intake part, observing by arrows sequence the ingress of the air coming from the public way in the system, finding the combustion engine working and warm.

Figure 6:
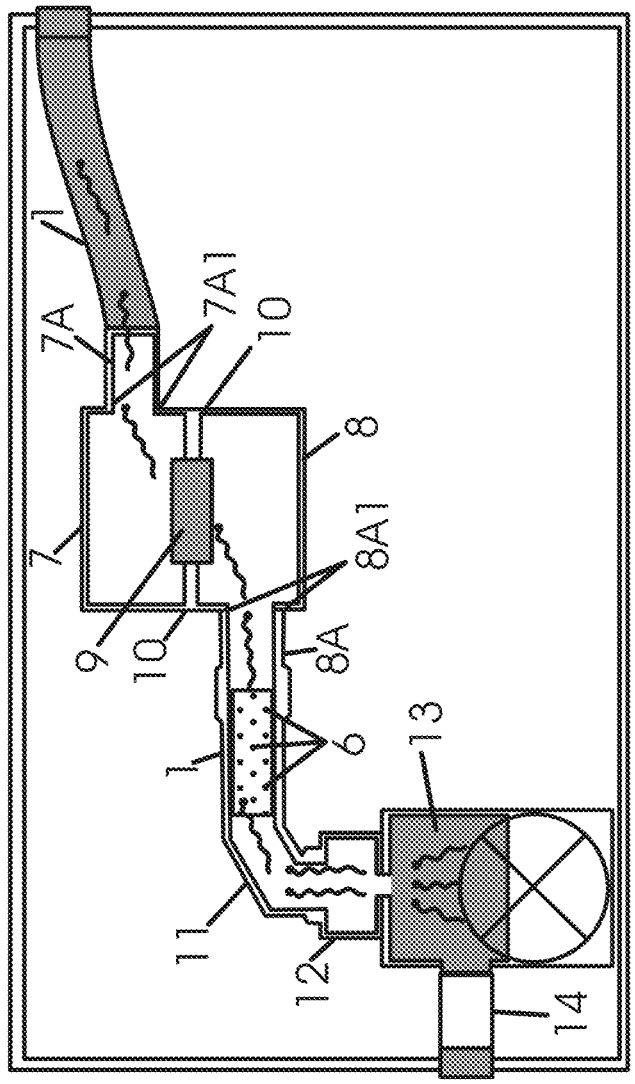
FIG. 6, shows a schematic view the complete air intake system with the combustion engine switched off.

FIG. 6 shows in a schematic view the complete air intake system, having two anti-pollution porous flex pipes integrated into it, finding the combustion engine switched off, after its function and the engine's environment going from warm to cold, observing the arrows sequence indicating the adsorption and retaining of the polluting hydrocarbons particles in the very body of the air conducting pipe when said engine is switched off, due to the activated charcoal (6) in agglomerate, powder or granulated form, added in the tapes formed by interlaced textile fibers, which comprise the walls or the external (1) and internal (3) lining of the anti-pollution porous flex pipe, or only the wall or internal lining (3).

Figure 7:
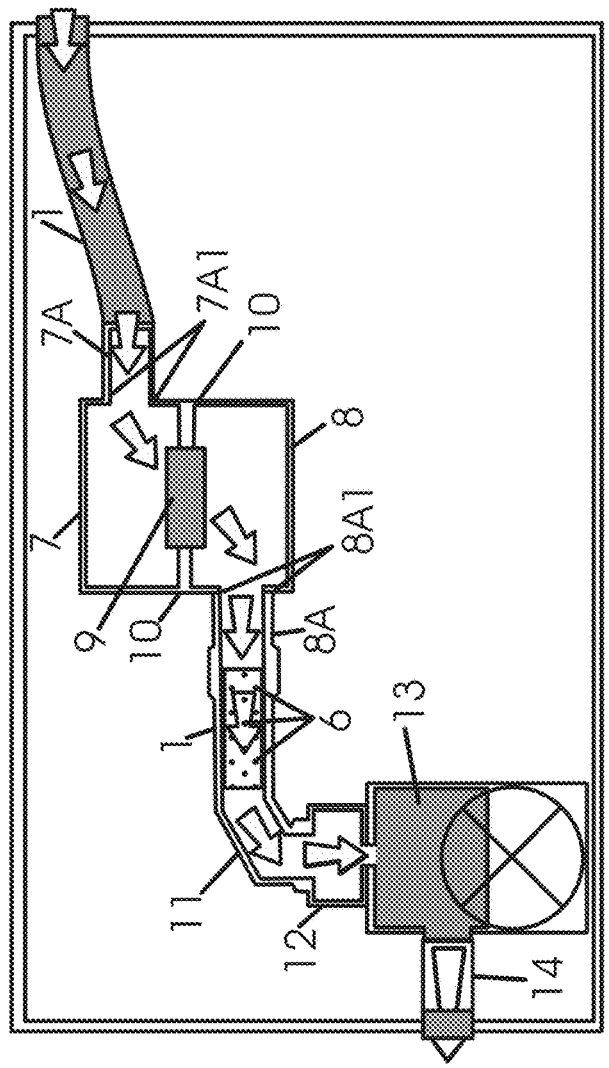
FIG. 7 shows a schematic view the complete air intake system with the combustion engine switched on again and re-warming.

FIG. 7 shows in a schematic view the complete air intake system, having two anti-pollution porous flex pipes integrated into it, with the combustion engine switched on again and the re-warming of the anti-pollution porous pipe active, object of this patent, and as a consequence, the release of the hydrocarbons from the activated charcoal (6) in the tapes formed by interlaced textile fibers, and which are drawn into the engine, followed by the burning of the hydrocarbon particles in the engine's combustion chamber, according to what is indicated by the sequence of arrows.

Therefore, in a complete air intake system of a combustion engine, according to what is depicted in FIGS. 5, 6 and 7, a first anti-pollution porous flex pipe is evidenced under the numerical reference of its wall or external lining (1), having added activated charcoal (6) in agglomerate, powder or granulated form, only in the tapes formed by interlaced textile fibers of its wall or internal lining of smaller diameter (3)—this (3) not evidenced in FIGS. 5, 6 and 7 —, being said first pipe coupled in the interior of the dirt air entrance nozzle (7-A) with a normally circular opening (7-A1) of the top compartment (7) of the air filter, which contains the filtrating element (9) and their internal supports (10) arranged among the top (7) and bottom (8) compartments of the air filter, the bottom compartment having (8) clean air exit nozzle (8-A) with a normally circular opening (8-A1), in which a second antipollution porous flex pipe is internally coupled, also under the numerical reference of its wall or external lining (1), having added activated charcoal (6) in agglomerate, powder or granulated form, in the tapes formed by interlaced textile fibers of its wall or external lining (1) and in the tapes formed by interlaced textile fibers of its wall or internal lining of lesser diameter (3)—this (3) not evidenced in FIGS. 5, 6 and 7—and the said second anti-pollution porous flex pipe involved by a conventional air-tight pipe (11), which is coupled around the clean air exit nozzle (8-A) and is coupled to the injection chamber (12) arranged over the combustion chamber (13) to which is coupled the tailpipe (13).

What is claimed is:

1. An anti-pollutant flexible porous tube configured for use with an intake system of a combustion engine, the porous tube comprising:
    a layer of variable width tape, wherein the tape is made of a non-porous material and arranged in a helical, interleaved and discontinued manner on the porous tube, further comprising:
    an external wall; and
    an internal wall with a smaller diameter than the external wall;
    wherein the external and internal walls are formed by interlaced textile fibers made of porous material arranged in a helical, intercalated and discontinuous manner containing an activated charcoal within them.

2. The porous tube of claim 1, wherein the non-porous material is selected from the group consisting of: PVC and thermoplastic.

3. The porous tube of claim 1, wherein the activated charcoal contained with the interlaced textile fibers is in a form selected from the group consisting of: agglomerate, power and granulated.

4. The porous tube of claim 1, wherein the tape forms an air conducting acoustic flexible helical tube.

5. The porous tube of claim 1, wherein the walls present continuous undulation to create greater surface contact for an increased acoustic effect.

6. The porous tube of claim 1, wherein the interlaced textile fibers are juxtaposed with other tapes of non-porous material in order to open a space in the walls.

\* \* \* \* \*